United States Patent
Anderson et al.

(10) Patent No.: US 6,979,807 B2
(45) Date of Patent: Dec. 27, 2005

(54) FORMING APPARATUS AND METHOD

(75) Inventors: Donald A. Anderson, Bellevue, WA (US); Ronald W. Brown, Des Moines, WA (US); Brad L. Kirkwood, Kent, WA (US); Marc R. Matsen, Seattle, WA (US); Douglas A. McCarville, Auburn, WA (US); Stephen G. Moore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 10/640,188

(22) Filed: Aug. 13, 2003

(65) Prior Publication Data

US 2005/0035115 A1 Feb. 17, 2005

(51) Int. Cl.[7] ................................................. H05B 6/10
(52) U.S. Cl. ..................... 219/757; 219/759; 156/379.6
(58) Field of Search ................................ 219/602–603, 219/615–617, 632–635, 646, 649, 657, 659; 228/157, 193, 122.1, 124.1, 56.1; 29/419.1; 428/633, 621, 675

(56) References Cited

U.S. PATENT DOCUMENTS

| | | | |
|---|---|---|---|
| 4,173,611 A | 11/1979 | Benson et al. | |
| 4,541,891 A | * 9/1985 | Leatherman | 156/379.6 |
| 5,229,562 A | 7/1993 | Burnett et al. | |
| 5,338,497 A | 8/1994 | Murray et al. | |
| 5,410,133 A | 4/1995 | Matsen et al. | |
| 5,530,227 A | 6/1996 | Matsen et al. | |
| 5,530,228 A | 6/1996 | Burnett et al. | |
| 5,582,849 A | 12/1996 | Lupke | |
| 5,591,369 A | 1/1997 | Matsen et al. | |
| 5,591,370 A | 1/1997 | Matsen et al. | |
| 5,645,744 A | 7/1997 | Matsen et al. | |
| 5,645,747 A | 7/1997 | Matsen et al. | |
| 5,683,608 A | 11/1997 | Matsen et al. | |
| 5,710,414 A | 1/1998 | Matsen et al. | |
| 5,728,309 A | 3/1998 | Matsen et al. | |
| 5,808,281 A | 9/1998 | Matsen et al. | |
| 6,180,932 B1 | 1/2001 | Matsen et al. | |
| 6,528,771 B1 | 3/2003 | Matsen et al. | |

* cited by examiner

*Primary Examiner*—Quang T. Van
(74) *Attorney, Agent, or Firm*—Alston & Bird LLP

(57) ABSTRACT

An apparatus and method for forming a composite workpiece are provided. An electromagnetic field generator induces a current in a susceptor, thereby heating the workpiece in a die cavity. An elastomeric bladder in the cavity is inflated and urges the workpiece against a contour surface corresponding to a desired configuration of the workpiece. Coolant fluid can also be circulated through the die cavity to cool the workpiece. Thus, the workpiece can be heated, formed, and cooled quickly and without substantial heating of other components, thereby reducing the time and energy relative to conventional forming methods.

33 Claims, 11 Drawing Sheets

FORMING APPARATUS AND METHOD

BACKGROUND OF THE INVENTION

1) Field of the Invention

The present invention relates to composite materials and, more particularly, relates to the forming of a composite workpiece by inductively heating the workpiece and applying pressure thereto.

2) Description of Related Art

Composite materials typically include a fibrous material such as graphite that is impregnated with a matrix material. The fibrous material is generally strong and stiff and is held in place by the matrix material, which can be formed of a thermoplastic resin, a thermoset resin, or a metal. In combination, the fiber and matrix can provide a strong, stiff, lightweight material, which can also have specific dimensional properties. Examples of composite materials include alumina-, boron-, or silicon carbide-based fibers provided in a weave, braid, or non-woven arrangement and combined with a matrix formed of Ultem® polyetherimide (PEI) resin, a registered trademark of General Electric Company, or other thermoplastic resins such as poly ether—ether ketone (PEEK) or poly phenylene sulphide (PES). Composites can also include a matrix formed of metal, such as titanium or aluminum, or a graphite composite with an insert of titanium or aluminum metal foil to create a fibermetal composite laminate.

According to one conventional method of manufacturing a composite member, tapes of the fibrous material that are preimpregnated with the matrix material are disposed on a mandrel or mold that defines the desired shape of the finished member. The preimpregnated tapes are then heated on the mandrel and consolidated against the mandrel. This method is generally time consuming, and often results in wasted materials such as the plaster mandrel.

Alternatively, composite laminates can be manufactured as a flat sheet, and subsequently formed to the desired shape. For example, the flat sheet can be inserted between one or more metal tools with contoured surfaces that define the desired shape of the sheet. The tools are heated, for example, using an oven or other heating device. Thermal energy is conducted from the tools to the composite sheet to heat the sheet to a forming temperature at which the tools can mold, or urge, the sheet to the desired shape. The tools are cooled with the formed composite sheet therebetween, and the sheet is then removed. The time and energy required for heating and cooling the tools adds to the expense of the manufacturing process.

Thus, there exists a need for an improved apparatus and method for forming a composite material. The apparatus and method should be capable of heating and cooling the composite material quickly to a temperature sufficient for consolidation, and preferably should not require that large supporting tool members be heated and cooled during each cycle.

BRIEF SUMMARY OF THE INVENTION

The present invention provides an apparatus and method for forming a composite workpiece to a desired configuration in a die cavity. An electromagnetic field generator induces a current in a susceptor, thereby heating the workpiece, and an elastomeric bladder in the die cavity urges the workpiece against a contour surface corresponding to the desired configuration. The workpiece can be heated quickly to a forming temperature without heating large supporting tool members in the die cavity. Further, coolant fluid can be supplied to the die cavity to cool the workpiece quickly or in an otherwise controlled manner. Thus, the time and energy required for forming the workpiece is reduced.

An apparatus according to one embodiment of the present invention includes first and second co-operable dies structured to define the die cavity therebetween for at least partially receiving the workpiece. At least one of the dies defines a contour surface corresponding to the desired configuration of the workpiece. The susceptor is provided in thermal communication with the die cavity, and the electromagnetic field generator is configured to induce a current within at least a portion of the at least one susceptor to heat the workpiece to the forming temperature. The susceptor can be characterized by a Curie temperature at which the susceptor becomes paramagnetic, and the Curie temperature can be about equal to the forming temperature of the workpiece. The electromagnetic field generator can be an induction coil extending around the workpiece and the susceptor and configured to generate an electromagnetic field when energized by a power supply. The elastomeric bladder is positioned in the die cavity, and the bladder is configured to receive a pressurized fluid for expanding the bladder and urging the workpiece against the contour surface to form the workpiece to the desired configuration. The bladder can be formed of a rubber or silicone elastomer and a thermally insulative material can be disposed on an outer surface of the bladder. In addition, a coolant source is configured to supply a coolant fluid to the die cavity and cool the workpiece. An inflatable susceptor engagement seal can be disposed at an interface between first and second portions of the at least one susceptor, and the seal can be configured to inflate and electrically engage the portions. An inflatable cavity seal can also be disposed at an interface of the first and second dies, and the cavity seal can be configured to receive a pressurized fluid to inflate the seal and hermetically seal the die cavity.

A fluid source can be fluidly connected to a passage defined by the induction coil, and the fluid source can be configured to circulate a cooling fluid through the passage to cool the induction coil. A coolant source can also be configured to circulate a coolant fluid through the die cavity, e.g., though the bladder and/or channels defined between the susceptor and the dies. The coolant source can also be configured to circulate the coolant fluid through a heat exchanger so that the coolant fluid is heated in the die cavity and cooled in the heat exchanger.

The present invention also provides a method for forming a composite workpiece. The method includes providing the workpiece at least partially in a die cavity, and positioning at least one elastomeric bladder in the die cavity proximate to the workpiece. First and second co-operable dies can be engaged to form the die cavity, and an inflatable cavity seal disposed at an interface of the dies can be pressurized to hermetically seal the die cavity. The workpiece can also be wrapped in a foil, which can be hermetically sealed and evacuated. An electromagnetic field generator is energized to induce a current within at least a portion of the susceptor, heating the susceptor, for example, to a Curie temperature. A susceptor engagement seal can be disposed at an interface of multiple portions of the susceptor, and the seal can be inflated to electrically engage the susceptor portions. The susceptor, in turn, heats the workpiece to a forming temperature, for example, about 600° F. to 900° F., for an interval of about 10 to 60 seconds. A pressurized fluid, for example, at about 200 to 400 psi, is injected into the bladder to expand the bladder to form the workpiece to a predetermined configuration. A coolant fluid is circulated through the die cavity, for example, through the bladder or through at least one channel defined between the dies and the susceptor disposed thereon. A cooling fluid can also be circulated though the induction coil that generates the electromagnetic field.

BRIEF DESCRIPTION OF THE SEVERAL VIEWS OF THE DRAWINGS

Figure 1:
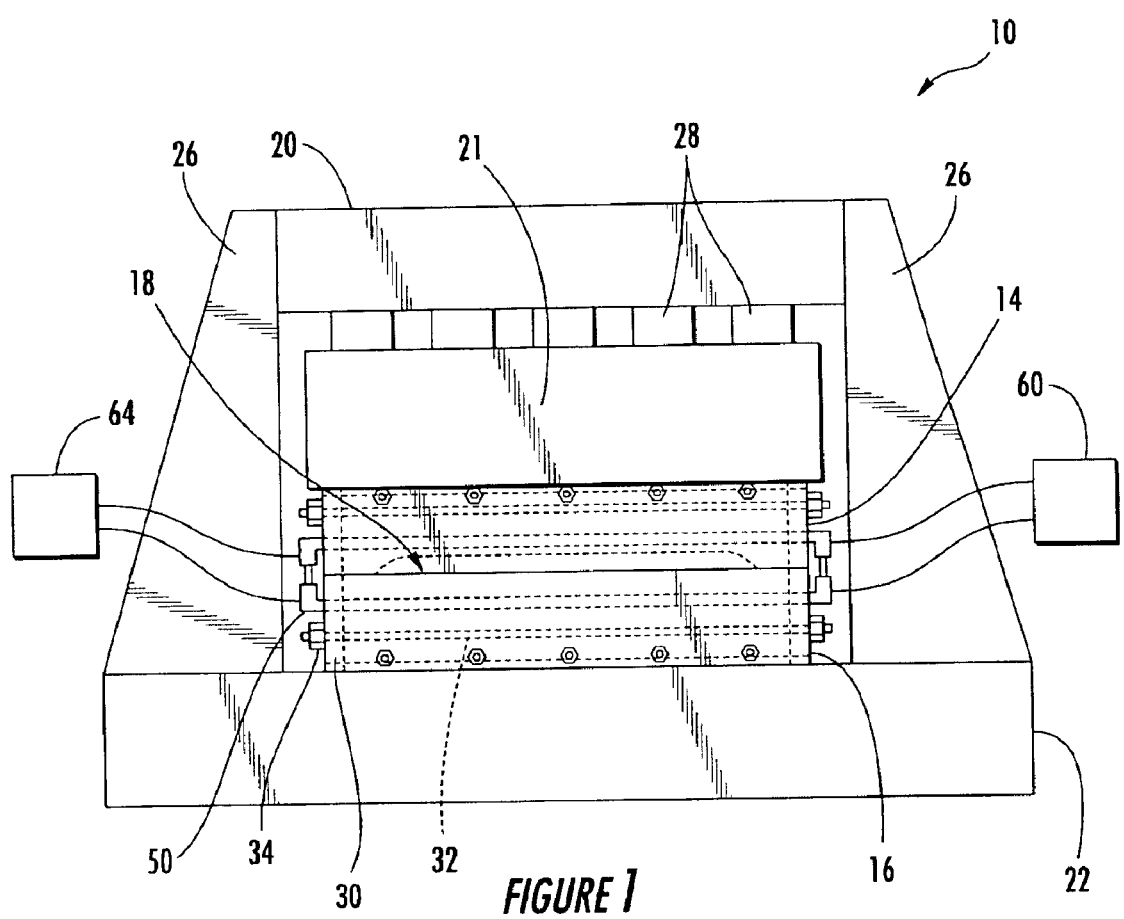
Figure 2:
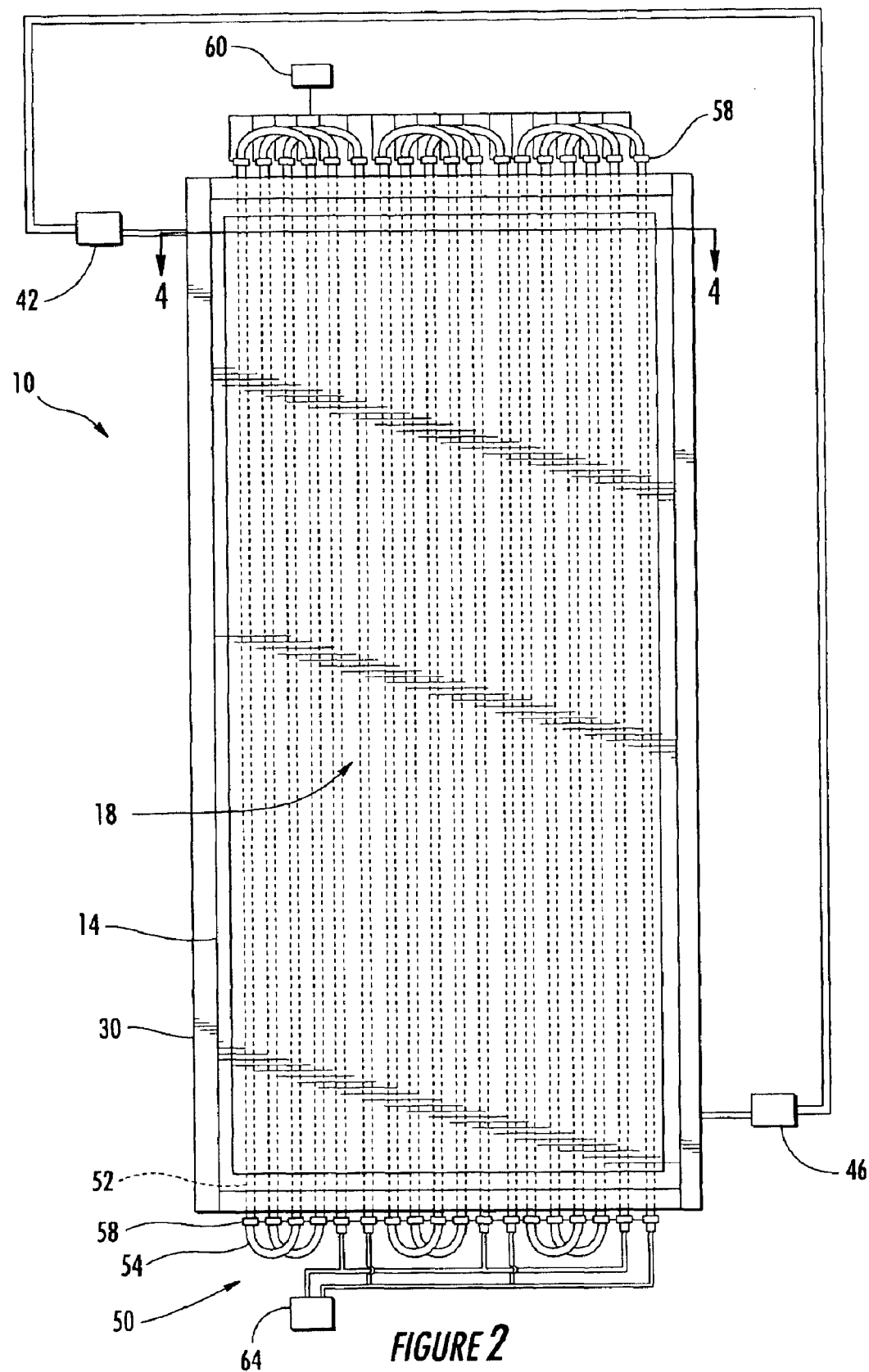
Figure 3:
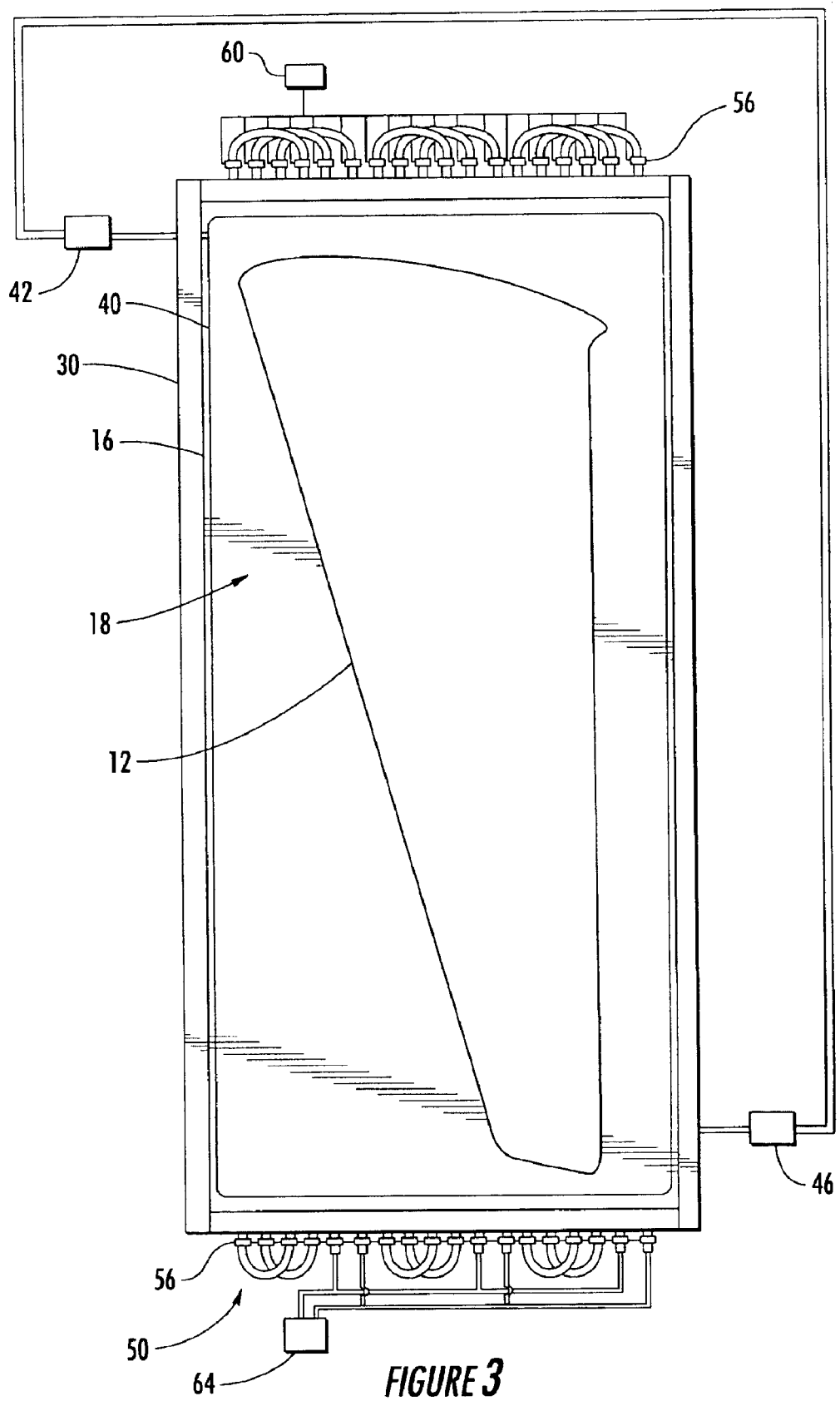
Figure 4:
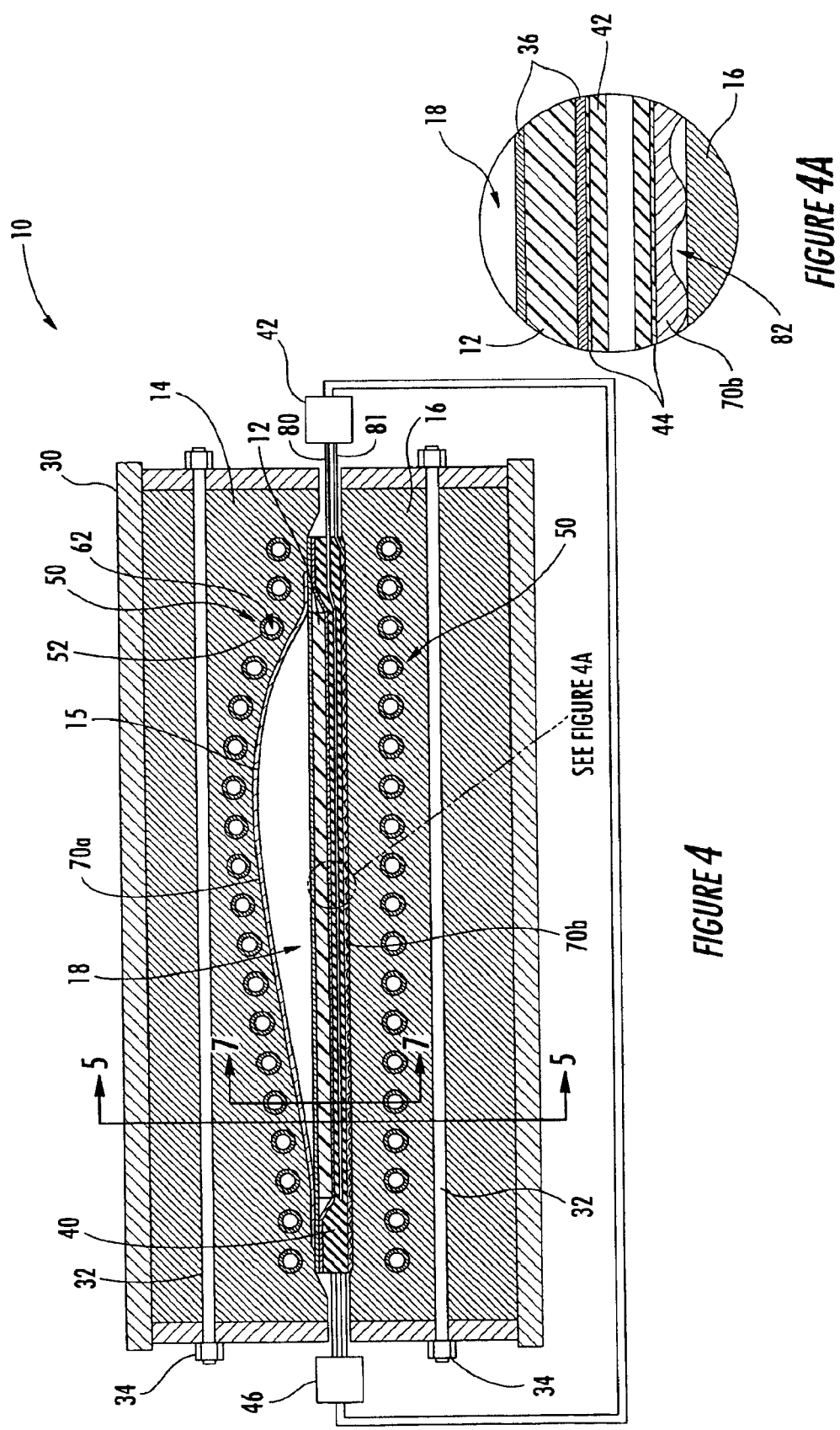
Figure 5:
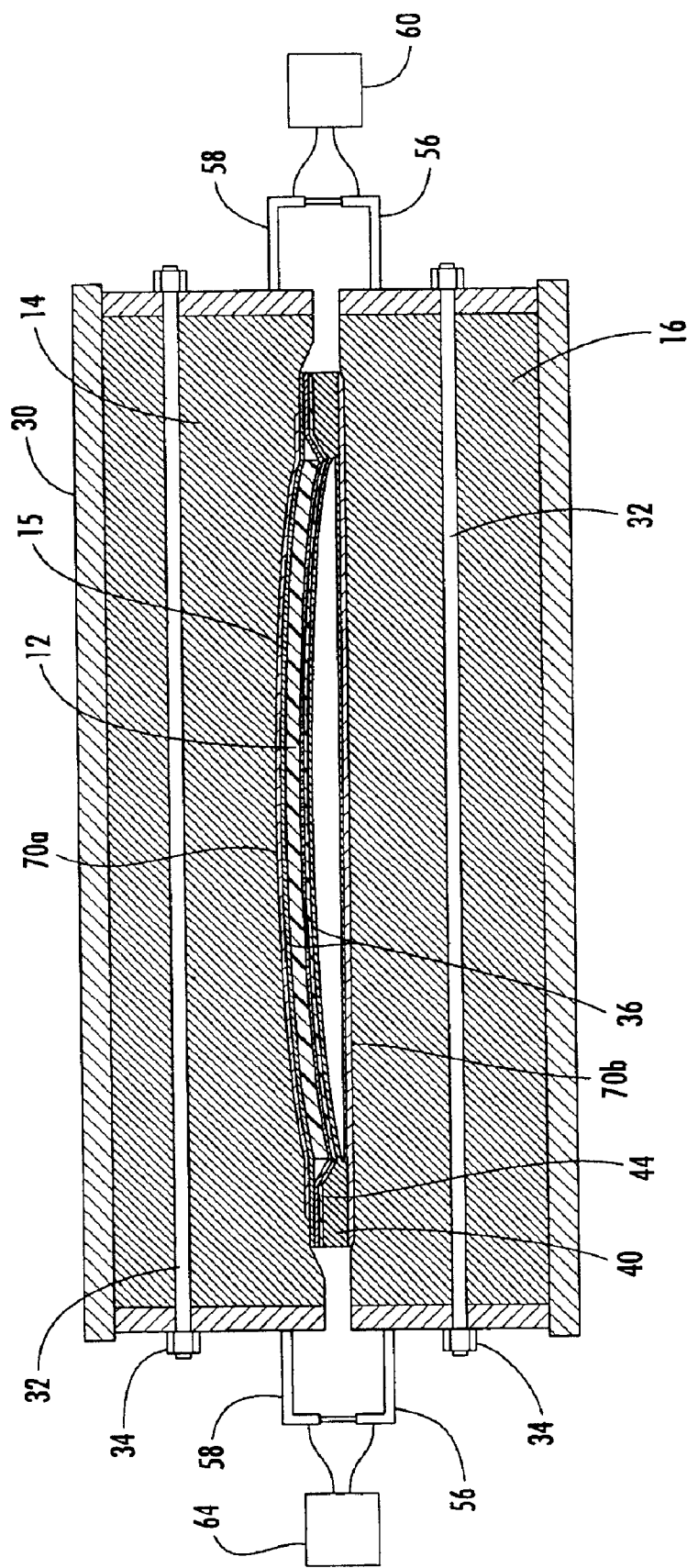
Figure 6:
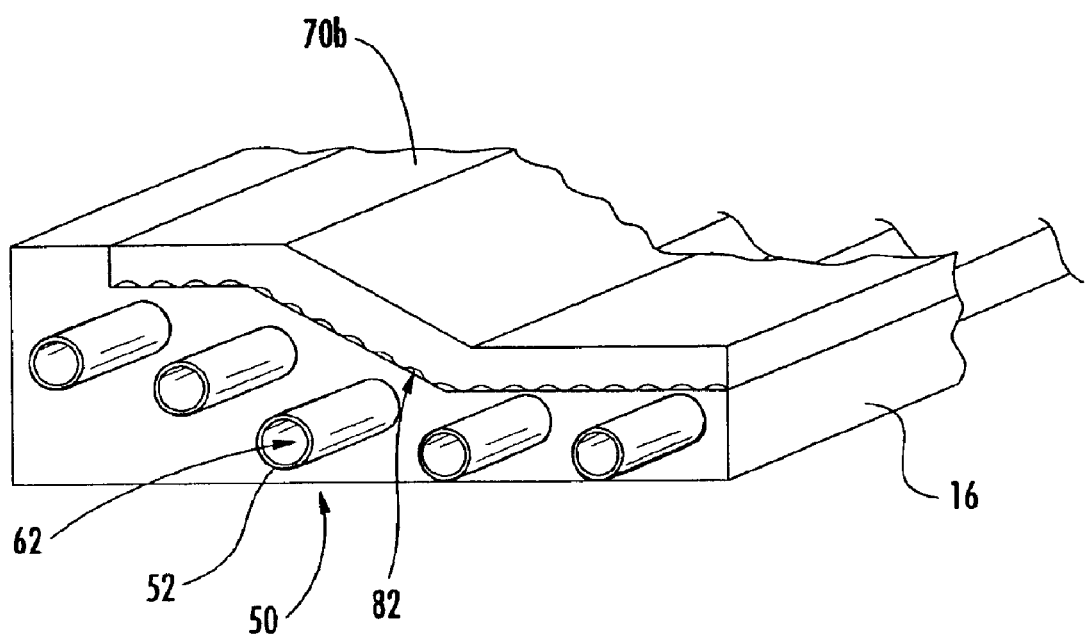
Figure 7:
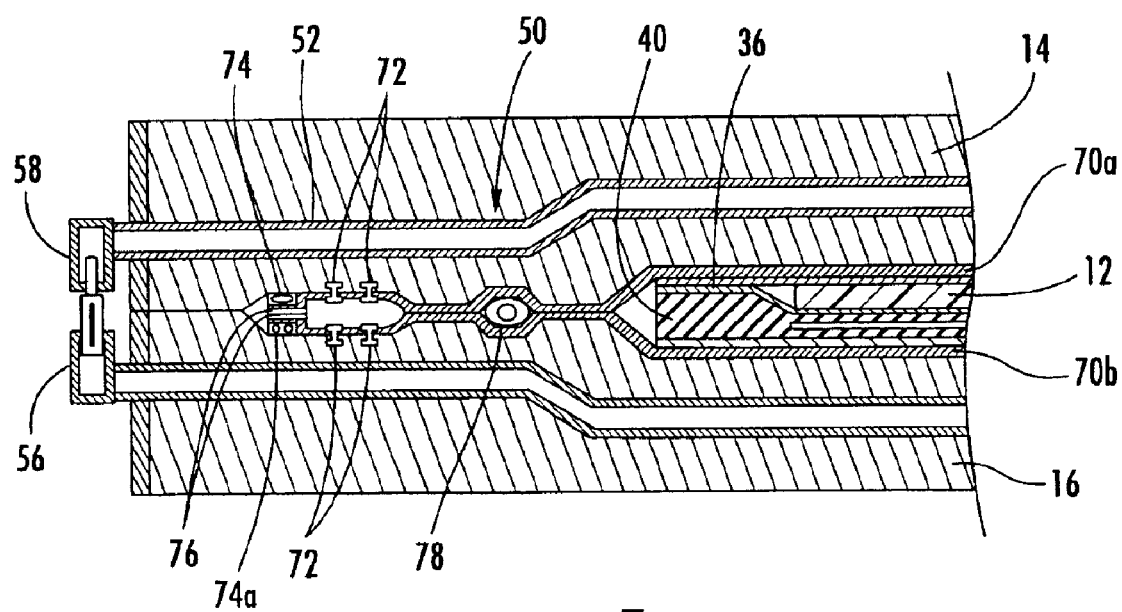
Figure 8:
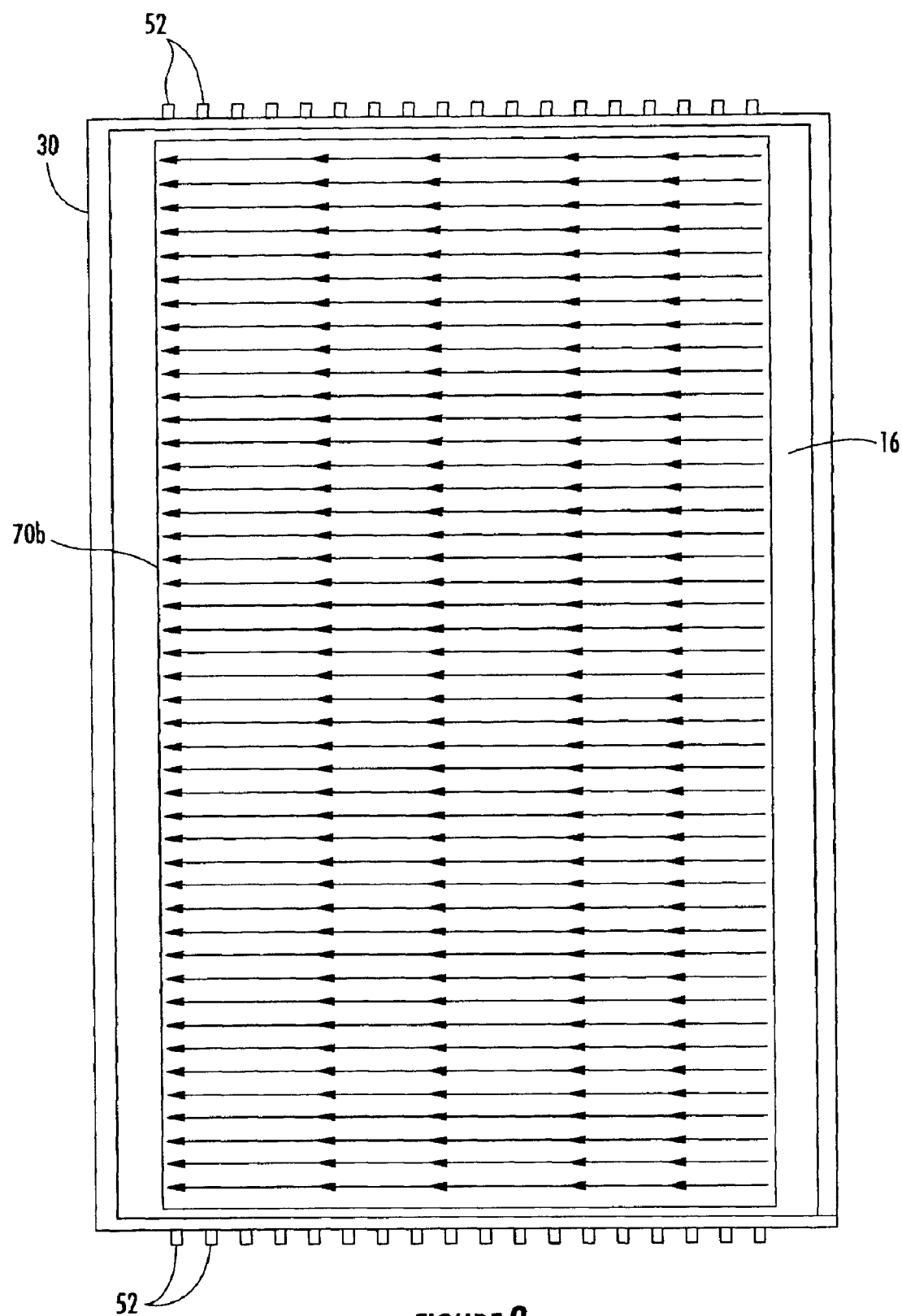
Figure 9:
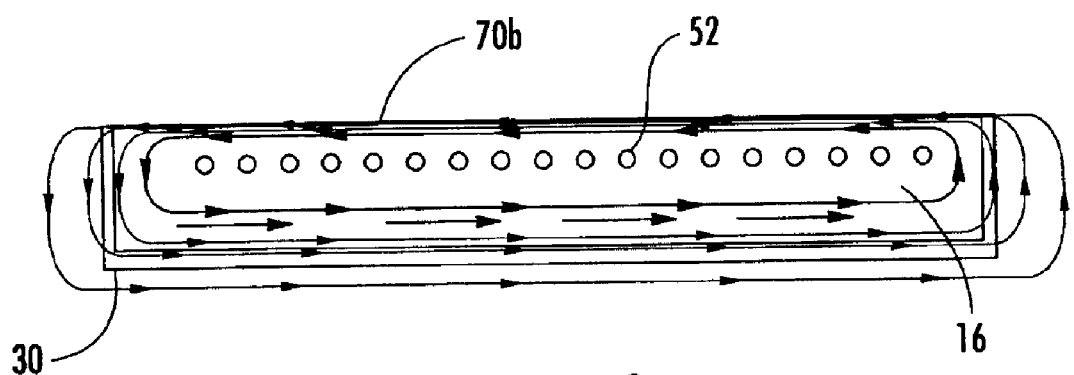
Figure 10:
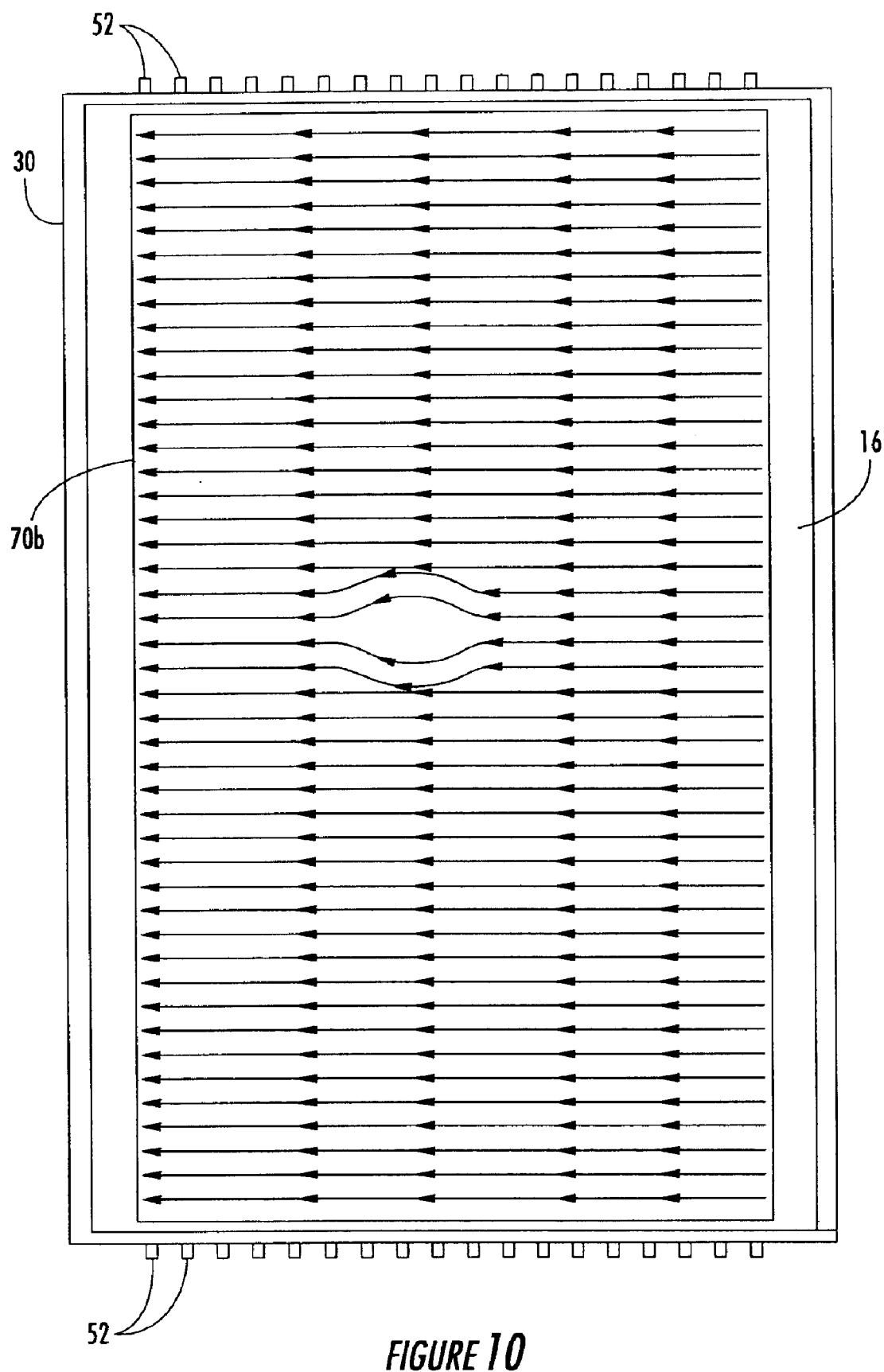
Figure 11:
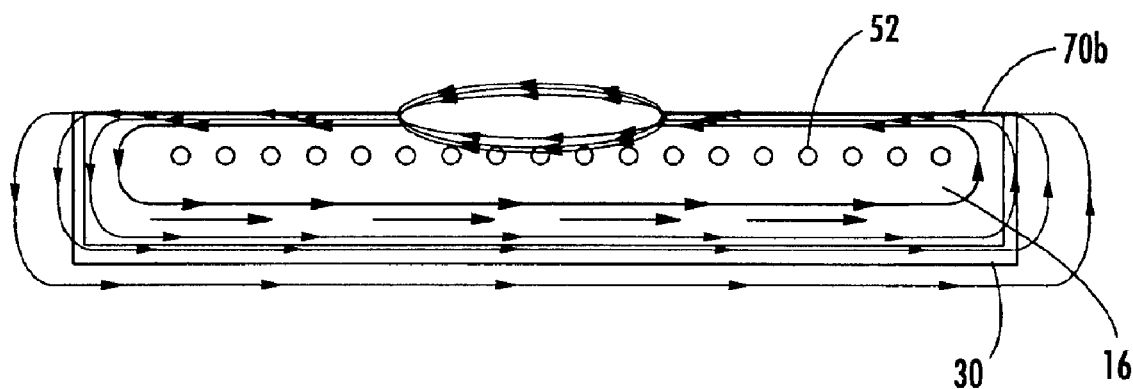

Having thus described the invention in general terms, reference will now be made to the accompanying drawings, which are not necessarily drawn to scale, and wherein:

FIG. 1 is an elevation view illustrating an apparatus for forming a workpiece, according to one embodiment of the present invention;

FIG. 2 is a plan view illustrating the apparatus of FIG. 1;

FIG. 3 a plan view of the first die of the apparatus of FIG. 1, shown with the die cavity open and with a workpiece and bladder arranged in the die cavity;

FIG. 4 is a section view illustrating the apparatus of FIG. 1 as seen along line 4—4 of FIG. 2, shown with the bladder uninflated;

FIG. 4A is an enlarged detail view as indicated in FIG. 4;

FIG. 5 is a section view illustrating the apparatus of FIG. 1 as seen along line 5—5 of FIG. 4, shown with the bladder expanded and the workpiece in a formed configuration;

FIG. 6 is a fragmentary perspective view illustrating part of the first die and the induction coil of the apparatus of FIG. 1;

FIG. 7 is a partial section view illustrating the seals and electrical connection pins of the apparatus of FIG. 1, as seen along line 7—7 of FIG. 2;

FIG. 8 is plan view illustrating a die with a susceptor having an induced electromagnetic field, according to one embodiment of the present invention;

FIG. 9 is an elevation view illustrating the die and susceptor of FIG. 8;

FIG. 10 is a plan view illustrating the die and susceptor of FIG. 8 wherein a portion of the susceptor has reached its Curie temperature and become paramagnetic; and FIG. 11 is an elevation view illustrating the die and susceptor of FIG. 8 wherein a portion of the susceptor has reached its Curie temperature and become paramagnetic.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIGS. 1 and 2, there is illustrated a forming apparatus 10, according to one embodiment of the present invention. The apparatus 10 can be used to form a composite workpiece 12 (FIG. 3) including a fibrous material and a matrix material to a desired configuration. For example, workpiece blanks that are substantially flat can be formed to a predetermined configuration of a curved, bent, or otherwise contoured panel or structure.

The apparatus 10 includes first and second dies 14, 16 that are co-operable and configured to define a die cavity 18 therebetween that is structured to at least partially receive the workpiece 12. The first and second dies 14, 16 are generally mounted to and supported by first and second strongbacks 20, 22, respectively, which may be secured using a mechanical support structure comprising perpendicular members 26. A "strongback" is a stiff plate, such as a metal plate, that acts as a mechanical constraint to keep the first and second dies 14, 16 together and to maintain the dimensional accuracy of the dies 14, 16. Additional strongback members can be provided such as an intermediate bolster 21. As shown in FIG. 1, the first die 14 is connected to the intermediate bolster 21, and the bolster 21 in turn is connected to the first strongback 20 via multiple actuators 28, such as hydraulic, pneumatic, or electric rams. The actuators 28 are configured to adjust the bolster 21 and, hence, the first die 14 toward or away from the second die 16, thereby opening or closing the die cavity 18. Other methods can also be used for configuring the dies 14, 16. For example, the first and/or second dies 14, 16 can be slidably adjustable on the perpendicular members 26, and either or both of the dies 14, 16 can be adjusted on the perpendicular members 26 to open the die cavity 18 using air bladders, hydraulic or pneumatic cylinders, mechanical jacks, levers, and the like.

The term "workpiece" is not meant to be limiting, and it is understood that the die cavity 18 can at least partially receive one or more workpieces 12 at a time. The workpiece 12 processed in the die cavity 18 can be simple or complex, and can be formed of a variety of composite materials. The fibrous material in the workpiece 12 can be graphite-based, fiberglass, alumina-based, boron-based, or silicon carbide-based fibers. The fibers can be provided as plies in a weave, braid, or non-woven arrangement or as a set-like mat of material. For example, mats of the fibrous material can be successively layered with the matrix material, which can be provided in film sheets. The matrix material can be a thermoplastic resin, such as a resin from the Ultem® family polyethernide (PEI) resins. Other useful thermoplastics include poly ether—ether ketone (PEEK) and Ryton® poly phenylene sulphide (PES), a registered trademark of Chevron Phillips Chemical Co., LP Chevron Phillips Chemical Holdings LLC. Thermoset resins can also be used, including any epoxy-based polymer, or metal matrix composite foils, such as titanium, aluminum, or alloys thereof Further, composite fiber metal laminates can be formed by including foils formed of such metals and metal alloys within a composite material of graphite and resin. The metal foils can be layered among the graphite fibers, and the foils can extend through all or part of the resulting laminate. The workpiece 12 can be a tailored workpiece blank, that is, a workpiece cut to particular dimensions such that the workpiece 12 can be formed to predetermined configuration. Blanks can be cut from a sheet of composite material that is consolidated in a flat configuration, as discussed in U.S. application Ser. No. 10/640,454, entitled "Consolidation Device and Method", filed concurrently herewith, which is assigned to the assignee of the present invention and the entirety of which is incorporated herein by reference. Further, additional pieces of material can be tacked or added to the worlcpiece 12, for example, by layering additional layers of composite material on the workpiece 12 to increase the thickness of certain portions of the workpiece 12. The workpieces 12 can be formed to correspond to the dimensions of a spar, beam, panel, or other structural member, which can be used in a variety of applications, for example, as a structural support in an aircraft wing, aircraft fuselage, other aeronautical vehicles, and the like. Structural members can also be fabricated for a wide variety of other applications including, without limitations, structural panels or other members for automotive or marine applications or the like.

One or more sheets 36, such as aluminum foil, can be disposed around the workpiece 12. For example, a single foil 36 sheet can be wrapped around the workpiece 12, or sheets 36 can be provided on either side of the workpiece 12 as shown in FIGS. 4 and 4A. The edges of the one or more sheets 36 can be sealed by pressing, crimping, welding, or using a sealant or other seal mechanism so that the workpiece 12 is contained within the sheets 36. Further, a pump or other evacuation device can be fluidly connected to the space defined by the sheets 36 and configured to evacuate air or other fluids therefrom. Thus, the sheets 36 can be drawn against the workpiece 12 by the evacuation of the space within the sheets 36 such that the sheets 36 secure the workpiece 12 and any additional pieces of material disposed thereon.

The evacuation of the sheets 36 can be performed before the forming process and/or during the forming process so that outgases expelled by the workpiece 12 during 10 forming are evacuated. The sheets 36 can also be formed of a variety of other materials. For example, an elastomeric material capable of withstanding the temperatures associated with forming can be used, such as for forming composite materials having a thermoset matrix material with a forming temperature of between about 300° F. and 350° F.

The first and second dies 14, 16 can be formed of a material characterized by a low thermal expansion, high thermal insulation, and a low electromagnetic absorption. For example, the dies 14, 16 can be formed of a material having a thermal expansion of less than about $0.45/(° F.\times10^6)$ throughout a temperature range of between about 0° F. and 1850° F., a thermal conductivity of about 4 Btu/(hr)(ft)(° F.) or less, and substantially no electromagnetic absorption. According to one embodiment of the present invention, the dies 14, 16 are formed of cast ceramic, for example, using a castable fusible silica product such as Castable 120 available from Ceradyne Thermo Materials of Scottdale, Ga. Castable 120 has a coefficient of thermal expansion less than about $0.45/(° F.\times10^6)$ for low expansion against composite materials, a thermal conductivity of about 0.47 Btu/(hr)(ft)(° F.) to act as a heat insulator during composite consolidation and cure, and a low electromagnetic absorption coefficient.

The dies 14, 16 can be at least partially contained within an outer structure such as a box-like structure 30 formed of phenolic material. Further, the dies 14, 16 and phenolic box 30 can be reinforced with fibers and/or fiberglass reinforcing rods 32. The rods 32 can extend both longitudinally and transversely through the phenolic structure 30 and the first and second dies 14, 16, as illustrated in FIG. 1. To provide a post-stressed compressive state to the first and second dies 14, 16, the rods 32 can be placed through the phenolic structure 30 and secured within the first and second dies 14, 16 at the time of casting. Thereafter, nuts 34 at the ends of the rods 32 can be tightened to provide the post-stressed compressive state to prevent cracking or other damage to the dies 14, 16. The first and second dies 14, 16, the phenolic structure 30, and the reinforcement rods 32 are described in U.S. Pat. No. 5,683,608, entitled "Ceramic Die for Induction Heating Work Cells," which issued on Nov. 4, 1997, and which is assigned to the assignee of the present invention and the entirety of which is incorporated herein by reference.

The first and second dies 14, 16 can define one or more contoured surfaces within the die cavity 18 that correspond to the shape of the workpiece 12. For example, the first die 14 of the apparatus shown in FIGS. 4 and 5 defines a contoured surface 15 that corresponds to a shape of an airfoil for a wing of an airplane. Thus, by forming the workpiece 12 against one or more contoured surfaces 15 of the first die 14, the workpiece 12 can be formed to the desired configuration of the wing. In other embodiments of the present invention, the second die 16 can additionally or alternatively define one or more contoured surfaces.

The workpiece 12 can be heated, urged against the dies 14, 16 by one or more inflatable bladders 40, and cooled in the desired, predetermined shape. For example, as shown in FIG. 4, the workpiece 12 is positioned in the die cavity 18 between the bladder 40 and the contoured surface 15 of the first die 14. The bladder 40 is fluidly connected to a source of pressurized fluid, such as coolant source 42, so that the bladder 40 can be expanded to urge the workpiece 12 into contact with the first die 14, as shown in FIG. 5. In other embodiments of the present invention, multiple bladders can be used to urge the workpiece 12 against the contoured surfaces 15. The bladder 40 can be formed of a pliable elastomeric material that can withstand the temperatures associated with forming the particular workpiece 12 that is being treated. For example, the bladder 40 can be formed of a rubber or a silicone elastomer, which can generally resist higher temperatures than rubber. A thermally insulative material 44 can be provided on or otherwise around the bladder 40, for example, as a layer disposed on the exterior of the bladder 40. The insulative material 44 can be fiberglass fabric or other high temperature woven insulators such as Refrasil®, a registered trademark of Hitco Carbon Composites, Inc. The insulative material 44 thermally insulates the bladder 40 from the workpiece 12 and/or the susceptors 70a, 70b during the forming process. The coolant source 42 can be a pressure generation device, such as a compressor, or the source 42 can be a pressure vessel that contains the pressurized fluid, which can be air, argon, other inert gases, or liquids such as water or oil. The coolant source 42 can also include a pressure regulation device in fluid communication with the bladder 40 and configured to control the pressure in the bladder 40.

The workpiece 12 is heated to the forming temperature by at least one heater. The heater can comprise any known heating device including, for example, a gas or electric oven. According to one advantageous embodiment of the present invention, at least one of the first and second dies 14, 16 includes at least one susceptor, as described more fully below, and the heater comprises an electromagnetic field generator. The electromagnetic field generator can be a plurality of induction coils 50, such as a solenoid coil as shown in FIGS. 2, 4, and 6, for inducing an electric current in the susceptors 70a, 70b. Each induction coil 50 typically includes a plurality of elongate tube sections 52 that are interconnected by curved tube sections 54 to form coils that are positioned proximate to the die cavity 18 and the corresponding susceptors 70a, 70b in which the current is to be induced. For example, the elongate tube sections 52 can be formed of 1.0 inch diameter copper tubing with a 0.0625 inch wall thickness. The tube sections 52 can alternatively be formed of tubular sections of other sizes and/or with other cross-sectional shapes, for example, square or triangular tubes. The tube sections 52 are generally formed of an electrically conductive material such as copper. Lightly drawn copper tubing can be used so that the tube sections 52 can be adjusted as necessary to correspond to the configuration of the corresponding die 14, 16. The tube sections 52 can be positioned relatively close to, such as about 0.75 inches from, the susceptors 70a, 70b. The curved tube sections 54 are typically disposed outside the dies 14, 16.

Each curved tube section 54 can be formed of a flexible, non-conductive material such as plastic, and each tube section 52 can be disposed within only one of the two dies 14, 16 so that the tube sections 52, 54 form separate fluid paths in the first and second dies 14, 16, i.e., the curved tube sections 54 connect the tube sections 52 to other tube sections 52 that are in the same die 14, 16. The tube sections 52 of 30 the two dies 14, 16 can also be electrically connected by pin and socket connectors 56, 58 as shown in FIG. 7, which can be disconnected when the dies 14, 16 are opened to expose the die cavity 18. The pin and socket connectors 56, 58 are preferably formed of a conductive material such as brass or copper. Thus, the pin and socket connectors 56, 58 maintain electrical conductivity between the tube sections 52 while the generally non-conductive curved sections 54 maintain fluid communication between the tube sections 52. Further, because the tube sections 52, 54 can form separate fluid paths in the first and second dies 14, 16, the dies 14, 16 can be opened without disconnecting the tube sections 52, 54. Therefore, the dies 14, 16 can be separated by disconnecting only the pin and socket connectors 56, 58, which can be quickly and easily connected and disconnected, thus simplifying the opening and closing of the die cavity 18.

The induction coil 50 is capable of being energized by one or more power supplies 60. The power supply 60 provides an alternating current to the induction coil 50, e.g., between about 3 and 10 kHz. This alternating current through the induction coil 50 induces a secondary current within the susceptors 70a, 70b that heats the susceptors 70a, 70b and, thus, the workpiece 12. The temperature of the susceptors 70a, 70b and the workpiece 12 can be inferred by monitoring electrical parameters within the one or more power supplies 60, as described in U.S. application Ser. No. 10/094,494, entitled "Induction Heating Process Control," filed Mar. 8, 2002, and which is assigned to the assignee of the present invention and is incorporated herein by reference.

Due to the low electromagnetic absorption of the dies 14, 16, the induction coil 50 induces a current within the susceptors 70a, 70b without inducing an appreciable current in the dies 14, 16. Therefore, the susceptors 70a, 70b can be heated to high temperatures without heating the dies 14, 16, thereby saving energy and time during heating and cooling of the workpiece 12. Further, due to the low thermal expansion of the dies 14, 16, the induction coil 50 can be kept relatively cool while the susceptors 70a, 70b heat the workpiece 12 without inducing stresses in the dies 14, 16 sufficient to cause spalling or otherwise degrading the dies 14, 16. Additionally, the low thermal conductivity of the ceramic dies 14, 16 reduces heat loss from the die cavity 18 and, thus, the workpiece 12.

As illustrated in FIGS. 4 and 6, the induction coil 50 can define a passage 62 for circulating a cooling fluid, such as water, from a fluid source 64. A pump (not shown) circulates the cooling fluid from the fluid source 64 through the passage 62. The cooling fluid cools the induction coil 50 to maintain low electrical resistivity in the coil 50. In addition, by positioning the induction coil 50 uniformly relative to the susceptors 70a, 70b, the induction coil 50 can be used to heat the susceptors 70a, 70b uniformly, and the cooling fluid can be used to transfer thermal energy from the susceptors 70a, 70b to cool the susceptors 70a, 70b. Thus, the cooling fluid can be used to cool the workpiece 12 after the workpiece 12 has been formed.

The susceptors 70a, 70b can be cast within either or both of the first and second dies 14, 16 or otherwise disposed thereon. The susceptors 70a, 70b are formed of a material that is characterized by a Curie temperature at which the susceptors 70a, 70b become paramagnetic, for example, a ferromagnetic alloy such as an alloy comprising iron and nickel. Susceptors having Curie temperatures at which each susceptor becomes non-magnetic, or paramagnetic, are described in U.S. Pat. No. 5,728,309, entitled "Method for Achieving Thermal Uniformity in Induction Processing of Organic Matrix Composites or Metals," which issued on Mar. 17, 1998; U.S. Pat. No. 5,645,744, entitled "Retort for Achieving Thermal Uniformity in Induction Processing of Organic Matrix Composites or Metals," which issued on Jul. 8, 1997; and U.S. Pat. No. 5,808,281, entitled "Multilayer Susceptors for Achieving Thermal Uniformity in Induction Processing of Organic Matrix Composites or Metals," which issued on Sep. 15, 1998, each of which is assigned to the assignee of the present invention and is incorporated herein by reference. The susceptors 70a, 70b can define the contoured surface 15 and can include an oxidation resistant nickel aluminide coating, which can be flame-sprayed or otherwise disposed on the surface of the susceptors 70a, 70b. A description of a susceptor with a nickel aluminide coating is provided in U.S. application Ser. No. 10/032,625, entitled "Smart Susceptors with Oxidation Control," filed Oct. 24, 2001, and which is assigned to the assignee of the present invention and is incorporated herein by reference.

The susceptors 70a, 70b can be provided as separate first and second portions 70a, 70b on the first and second dies 14, 16 so that when the dies 14, 16 are opened the susceptors 70a, 70b are also opened and the workpiece 12 and/or bladder 40 can be inserted or removed from the die cavity 18. The susceptors 70a, 70b and/or the dies 14, 16 can define channels 82 therebetween. A fluid source, such as the coolant source 42 discussed above, can be fluidly connected to the channels 82 and configured to circulate a coolant fluid through the channels 82, for example, to cool the susceptors 70a, 70b and the workpiece 12 after forming. The fluid can be evacuated from the die cavity to a heat exchanger 46, which cools the fluid. The fluid can be recirculated from the heat exchanger 46 to the source 42 for reuse.

As illustrated in FIG. 7, the individual susceptors 70a, 70b can be connected to the respective dies 14, 16 by studs 72, rivets, or other connectors such as screws, bolts, clips, weld joints, and the like. The susceptors 70a, 70b can be configured on the dies 14, 16 such that the edges of the susceptors 70a, 70b make electrical contact when the dies 14, 16 are closed. Further, one or more inflatable susceptor engagement seals 74, 74a can be used to urge the edges or other portions of the susceptors 70a, 70b together and electrically engage the susceptors 70a, 70b, as shown in FIG. 7. The susceptor engagement seals 74, 74a, which can be formed of stainless steel, such as 300 series austenitic stainless steel, can extend around the perimeter of the susceptors 70a, 70b. The susceptor engagement seals 74 can be connected to the dies 14, 16, for example, by the studs 72 or by a T-shaped flange of each seal 74, 74a that engages a corresponding slot in the respective die 14, 16.

Each susceptor engagement seal 74, 74a can be connected to a fluid source that provides a pressurized fluid such as compressed air to the susceptor seals 74, 74a and inflates one or both of the seals 74, 74a to urge the susceptors 70a, 70b together. For example, only one susceptor seal 74 is configured to be inflated in FIG. 7, though both of the susceptor seals 74, 74a can be inflated in other embodiments of the present invention. As shown in FIG. 7, the susceptor seal 74a positioned between the susceptor and the second die 16, which is formed of copper and is not configured to inflate, defines two passageways through which a coolant such as water from a fluid source can be circulated. The fluid sources for inflating and cooling the susceptor seals 74, 74a can be the coolant source 42 that is used to expand the bladders 40, or different fluid sources (not shown) can be used. Alternatively, the susceptor seals 74, 74a can be used without a fluid source. For example, each susceptor seal 74, 74a can be deformed against the susceptors 70a, 70b when the dies 14, 16 are closed so that the susceptor seals 74, 74a urge the susceptors 70a, 70b together. Although two susceptor seals 74, 74a are shown in FIG. 7, a single seal can alternatively be used. For example, the single susceptor seal can urge the edges of both susceptors 70a, 70b against a fixed portion of one of the dies 14, 16.

Due to the electrical contact between the susceptors 70a, 70b, eddy currents induced in the susceptors 70a, 70b by the induction coils 50, as explained more fully below, can flow throughout the susceptors 70a, 70b. Additionally, the susceptors 70a, 70b can include contacts 76 that enhance the electrical connection between the susceptors 70a, 70b, for example, by increasing the durability or oxidation resistance of the susceptors 70a, 70b at the interface therebetween. The contacts 76 can be formed of copper, gold, or other electrical conductors that are plated, welded, or otherwise provided on the susceptors 70a, 70b.

As shown in FIG. 7, the apparatus 10 can also include a cavity seal 78 that is disposed between the dies 14, 16, for example, between the susceptors 70a, 70b at a location between the die cavity 18 and the susceptor seals 74, 74a. The cavity seal 78 can be a tube-like structure that extends continuously around the die cavity 18 so that the cavity seal 78 can be used to seal the die cavity 18. The cavity seal 78 can be formed of a variety of materials including, but not limited to, aluminum tubing. Typically, the cavity seal 78 is formed of a material that can operate at the elevated temperatures associated with the forming process. The cavity seal 78 can also be fluidly connected to a fluid source (not shown) that provides a pressurized fluid, such as air, to the cavity seal 78, thereby inflating the cavity seal 78 and urging the cavity seal 78 outwards against the susceptors 70a, 70b to form a hermetic seal around the die cavity 18. The fluid source that is used to inflate the cavity seal 78 can be the same fluid source that is used to inflate and/or cool the susceptor seals 74, 74a, the coolant source 42 that is used to expand the bladders 40, or a different fluid source.

One or more pipes 80, tubes, or other fluid communication devices can extend through the cavity seal 78, through one of the susceptors 70a, 70b, or between the cavity seal 78 and one of the susceptors 70a, 70b as shown in FIGS. 2 and 4. The pipes 80 fluidly connect the bladder 40 in the die cavity 18 with the pressurized coolant source 42, so that the coolant source 42 can supply fluid to the bladder 40 while the die cavity 18 is sealed by the cavity seal 78 during processing. Pipes or other fluid connectors can also provide a coolant fluid to the channels 82. Additional pipes can also be provided for evacuating the sheets 36 around the workpiece 12.

The susceptors 70a, 70b are heated through eddy current heating to the Curie temperature of the susceptors 70a, 70b, whereupon the susceptors 70a, 70b become paramagnetic and does not heat further. Eddy current heating of the susceptors 70a, 70b results from eddy currents that are induced in the susceptor by the electromagnetic field generated by the induction coil 50. FIGS. 8–11 illustrate the magnetic flux in one of the susceptors 70a, 70b. The flow of the eddy currents through the susceptors 70a, 70b results in resistive heating of the susceptors 70a, 70b. If some portions of the susceptors 70a, 70b are heated more quickly than other portions, the hotter portions will reach the Curie temperature and become paramagnetic before the other, cooler portions of the susceptors 70a, 70b. As illustrated in FIGS. 10 and 11, the magnetic flux lines will then flow through the cooler magnetic portions, i.e., around the hotter, paramagnetic portions of the susceptors 70a, 70b. The current in the susceptors 70a, 70b, which flows substantially perpendicular to the magnetic flux but is proportional to the magnetic flux density, causes the cooler portions to also become heated to the Curie temperature. Therefore, even if some portions of the susceptors 70a, 70b heat at different rates, the entire susceptors 70a, 70b are heated to a uniform Curie temperature. Preferably, the susceptors 70a, 70b act as a magnetic shield that prevents the induction coil 50 from inducing a current in the workpiece 12. As such, the induction coil 50 does not heat the structural workpiece 12 directly, but rather heats the susceptors 70a, 70b, which, in turn, act as a heat source in contact with the workpiece 12.

The Curie temperature of the susceptors 70a, 70b can correspond to the forming temperature of the workpiece 12, i.e., the temperature at which the workpiece 12 can be formed. For example, the Curie temperature of the susceptors 70a, 70b can be equal to or slightly greater than the forming temperature of the workpiece 12 so that the workpiece 12 is heated to the forming temperature when the susceptors 70a, 70b are heated to the Curie temperature. The forming temperature of the workpiece 12 can be the melting temperature of the matrix material or otherwise sufficient for forming the workpiece 12, for example, between about 600° F. and 900° F. Thus, the susceptors 70a, 70b can be used to heat the workpiece 12 uniformly to the forming temperature so that the workpiece 12 can be formed. The susceptors 70a, 70b can be formed of a variety of materials including iron, nickel, cobalt, and alloys thereof, and the composition of the susceptors 70a, 70b can be designed to achieve a desired Curie temperature that is appropriate for a particular type of material. For example, susceptors 70a, 70b with a Curie temperature of about 750° F. can be used for forming a composite workpiece of Ultem® resin. In one embodiment, the susceptors 70a, 70b are formed of an alloy that typically includes approximately 53% iron, 29% nickel, 17% cobalt, and 0.2% chromium, generally referred to as Kovar®, a registered trademark of CRS Holdings, Inc. This alloy has a Curie temperature of about 750° F., at which temperature Ultem® resin and certain other thermoplastic resins can be softened or plasticized for forming. Workpieces having thermoset resins are typically formed at lower temperatures, for example, between about 300° F. and 350° F. The workpiece 12 can be heated to the forming temperature and formed within about two minutes. For example, in one embodiment, the workpiece 12 is heated in about 15 to 30 seconds and formed within about one minute. Further, the susceptors 70a, 70b can be removable from the dies 14, 16 and can be replaced if they become worn or if it is desired to install susceptors 70a, 70b with a different Curie temperature. Thus, the apparatus 10 can be used for forming workpieces 12 formed of a variety of different composite materials.

During operation according to one embodiment of the present invention, the workpiece 12 is a blank, which can be cut to a predetermined shape that corresponds to the desired dimensions of a structural member to be formed. Additional pieces of material can also be tacked to the workpiece 12 to form the blank. For example, additional pieces of composite material can be layered on some areas of the workpiece 12, such as near locations for holes or other features in the workpiece 12, so that the workpiece 12 is made thicker in those areas. The workpiece 12 is disposed between the foil sheets 36, and the sheets 36 can be pressed closed or sealed at a perimeter of the sheets 36 around the workpiece 12. The space within the sheets 36 can be evacuated so that the workpiece 12 and any pieces of additional material added thereto are held in place by the sheets 36. The workpiece 12 is disposed in the die cavity 18 with the bladder 40, for example, between the bladder 40 and the contoured surface 15 of the first die 14. One or both of the dies 14, 16 are adjusted to close the die cavity 18. The pin and socket connectors 56, 58 can be configured to engage as the die cavity 18 is closed so that the induction coil 50 forms a circuit extending around the workpiece 12. The susceptors 70a, 70b are also electrically engaged, for example, by urging the dies 14, 16 together or by inflating the susceptor engagement seal 74. The die cavity 18 can also be sealed by inflating the cavity seal 78.

The workpiece 12 is then heated, for example, by energizing the power supply 60 so that the induction coil 50 provides an electromagnetic field that induces a current in the susceptors 70a, 70b. The susceptors 70a, 70b can be heated to a Curie temperature that corresponds to the forming temperature of the workpiece 12, for example, about 750° F., within about 15 to 30 seconds, though shorter and longer heating cycles are possible. Before, during, or after the heating of the workpiece 12, the bladder 40 is inflated, thereby urging the workpiece 12 against the contoured surface 15. For example, the bladder 40 can be pressurized to a pressure between about 200 to 400 psi, such as about 300 psi. Alternatively, the workpiece 12 can be formed without the bladder 40 by pressurizing the die cavity 18, for example, between the second die 16 and the workpiece 12 to urge the workpiece 12 against the first die 14. Air, outgases, and other fluids can be evacuated from the space within the sheets 36 during the heating, forming, and cooling of the workpiece 12. After the workpiece 12 is formed against the contoured surface 15, the pressure in the bladder 40 can be maintained while the workpiece 12 cools. Preferably, the workpiece 12 is cooled in the apparatus 10 to below a plasticizing temperature such that the workpiece 12 can be removed from the die cavity 18 without substantially plastically deforming the workpiece 12 from its formed shape. A coolant fluid such as the pressurized fluid from the source 42 can be circulated through the bladder 40 while the bladder 40 is pressurized to cool the workpiece 12. For example, the coolant fluid can be air circulated through the bladder 40 at a rate of about 1 CFM/SF (cubic foot per minute per square foot of surface area of the workpiece 12) after the workpiece 12 is formed and while the bladder 40 is maintained at a pressure sufficient for holding the workpiece 12 against the contoured surface 15. The coolant fluid can additionally or alternatively be circulated through the channels 82, for example, at a rate of about 0.2 CFM/SF. Preferably, the coolant fluid is circulated at a flow rate sufficient for cooling the workpiece 12 at a rate of at least about 50° F. per second, and the workpiece 12 is cooled to a temperature less than its plasticizing temperature so that the workpiece 12 can be removed from the die cavity 18 without being significantly deformed. The coolant fluid can be cooled in the heat exchanger 46 and recycled. Further, the same coolant fluid or another cooling fluid can be circulated through the induction coil 50 to cool the workpiece 12. The duration of the entire forming cycle of the workpiece 12 can vary, but in some embodiments can be less than about two minutes.

Further, heat treatments can be performed on the workpiece 12 while the workpiece 12 is in the die cavity 18. For example, the workpiece 12 can be heated and cooled according to a predetermined schedule. Such heat treatment are discussed in U.S. application Ser. No. 10/431,295, entitled "Method and Apparatus for Induction Heat Treatment of Structural Members," filed May 7, 2003, and which is assigned to the assignee of the present invention and is incorporated herein by reference.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming a composite workpiece, the method comprising:
   engaging first and second co-operable dies to form a die cavity;
   providing the workpiece at least partially in the die cavity;
   positioning at least one elastomeric bladder in the die cavity proximate to the workpiece;
   pressurizing an inflatable cavity seal disposed at an interface of the dies to thereby hermetically seal the die cavity;
   inducing a current within at least a portion of at least one susceptor, thereby heating the workpiece to a forming temperature;
   injecting a pressurized fluid into the bladder and thereby expanding the bladder to form the workpiece to a predetermined configuration; and
   circulating a coolant fluid through the die cavity and thereby cooling the workpiece subsequent to said injecting step.

2. A method according to claim 1 wherein said providing step comprises providing a plurality of layered fibrous mats and resin films to form the workpiece.

3. A method according to claim 1 wherein said providing step comprises providing a composite workpiece blank having a fibrous material and a matrix material.

4. A method according to claim 1 wherein said inducing step comprises heating the susceptor to a Curie temperature at which the susceptor becomes paramagnetic.

5. A method according to claim 1 wherein said inducing step comprises heating the workpiece to a temperature of between about 600° F. and 900° F. during a time interval of between about 10 and 60 seconds.

6. A method according to claim 1 wherein said circulating step comprises pressurizing the bladder to between about 200 and 400 psi.

7. A method according to claim 1 wherein said circulating step comprises circulating the coolant fluid through at least one channel defined between one of the dies and the susceptor disposed theron.

8. A method accoring to claim 1 further comprising ciculating a cooling fluid though a passage defined by an induction coil extending around the workpiece and the susceptor, and wherein said inducing step comprises electrically energizing the induction coil.

9. A method according to claim 1 wherein said circulating step comprises circulating a pressurized coolant fluid through the bladder, thereby cooling the bladder.

10. A method according to claim further comprising inflating a susceptor engagement seal disposed at an interface of first and second portions of the at least one susceptor and thereby electrically engaging the first and second portions.

11. A method according to claim 1 wherein said providing step comprises disposing a foil around the workpiece.

12. A method according to claim 11 further comprising hermetically sealing the foil and evacuating a space defined within the foil.

13. A method according to claim 1 wherein said positioning step comprises positioning the bladder in the die cavity with an inner surface of the bladder defining an internal space and an opposite outer surface disposed toward the die cavity, and wherein said injecting step comprises injecting a pressurized fluid into the bladder and thereby expanding the space defined by the inner surface of the bladder such that the outer surface of the bladder is adjusted outward toward the die cavity to form the workpiece to the predetermined configuration.

14. A method according to claim 13 wherein said circulating step comprises substantially filling the internal space defined by the inner surface of the bladder with a pressurized coolant fluid and circulating the coolant fluid through the internal space to cool the bladder.

15. A method according to claim 1, further comprising providing the die cavity defined by at least one die defining a contour surface corresponding to the desired configuration of the workpiece.

16. A method for forming a composite workpiece, the method comprising:
providing the workpiece at least partially in a die cavity;
positioning at least one elastomeric bladder in the die cavity proximate to the workpiece;
inducing a current within at least a portion of at least one susceptor, thereby heating the workpiece to a forming temperature;
injecting a pressurized fluid into the bladder and thereby expanding the bladder to form the workpiece to a predetermined configuration against a surface of the die cavity; and
circulating a coolant fluid through the die cavity and thereby cooling the workpiece subsequent to said injecting step.

17. A method according to claim 16 wherein said providing step comprises providing a plurality of layered fibrous mats and resin films to form the workpiece.

18. A method according to claim 16 wherein said providing step comprises providing a composite workpiece blank having a fibrous material and a matrix material.

19. A method according to claim 16 wherein said inducing step comprises heating the susceptor to a Curie temperature at which the susceptor becomes paramagnetic.

20. A method according to claim 16 wherein said inducing step comprisess heating the workpiece to a temperature of between about 600° F. and 900° F. during a time interval of between about 10 and 60 seconds.

21. A method according to claim 16 wherein said injecting step comprises pressurizing the bladder to between about 200 and 400 psi.

22. A method according to claim 16 wherein said circulating step comprises circulating the coolant fluid through at least one channel defined between one of the dies and the susceptor disposed thereon.

23. A method according to claim 16 further comprising circulating a cooling fluid though a passage defined by an induction coil extending around the workpiece and the susceptor, and wherein said inducing step comprises electrically energizing the induction coil.

24. A method according to claim 16 wherein said circulating step comprises circulating a pressurized coolant fluid through the bladder, hereby cooling the bladder.

25. A method according to claim 16 further comprising inflating a susceptor engagement seal disposed at an interface of first and second portions of the at least one susceptor and thereby electrically engaging the first and second portions.

26. A method according to claim 16 further comprising engaging first and second co-operable dies to form the die cavity and pressuriznig an inflatable cavity seal disposed at an interface of the dies to thereby hermitically seal the die cavity.

27. A method according to claim 16 wherein said providing step comprises disposing a foil around the workpiece.

28. A method according to claim 27 further comprising hermetically sealing the foil and evacuating a space defined within the foil.

29. A method according to claim 16 wherein said positioning step comprises positioning the bladder in the die cavity with an inner surface of the bladder defining an internal space and an opposite outer surface disposed toward the die cavity, and wherein said injectingng step comprises injecting a pressurized fluid into the bladder and thereby expanding the space defined by the inner surface of the bladder such that the outer surface of the bladder is adjusted outward toward the die cavity to form the workpiece to the predetermined configuration.

30. A method according to claim 29 wherein said circulating step comprises substantially filling the internal space defined by the inner surface of the bladder with a pressurized coolant fluid and circulating the coolant fluid through the internal space to cool the bladder.

31. A method according to claim 16, further comprising providing the die cavity defined by at least one die defining a contour surface corresponding to the desired configuration of the workpiece.

32. A method for forming a composite workpiece the method comprising:
providing the workpiece at least partially in a die cavity and disposing a foil around the workpiece;
positioning at least one elastomeric bladder in the die cavity proximate to the workpiece;
inducing a current within at least a portion of at least one susceptor, thereby heating the workpiece to a forming temperature;
injecting a pressurized fluid into the bladder and thereby expanding the bladder to form the workpiece to a predetermined configuration; and
circulating a coolant fluid through the die cavity and thereby cooling the workpiece subsequent to said injecting step.

33. A method according to claim 32 further comprising hermetically sealing the foil and evacuating a space defined within the foil.

* * * * *

UNITED STATES PATENT AND TRADEMARK OFFICE
CERTIFICATE OF CORRECTION

PATENT NO. : 6,979,807 B2 Page 1 of 1
DATED : December 27, 2005
INVENTOR(S) : Anderson et al.

It is certified that error appears in the above-identified patent and that said Letters Patent is hereby corrected as shown below:

Column 12,
Line 53, "circulating" should read -- injecting --.

Signed and Sealed this

Eleventh Day of April, 2006

JON W. DUDAS
*Director of the United States Patent and Trademark Office*